United States Patent [19]

English

[11] 4,331,047
[45] May 25, 1982

[54] SAW SHARPENING MACHINE

[76] Inventor: Cecil English, 7440 Morgan Rd., Woodbine, Md. 21797

[21] Appl. No.: 145,380

[22] Filed: Apr. 30, 1980

[51] Int. Cl.³ .................... B23D 63/14; B23D 63/06; B23D 63/20

[52] U.S. Cl. ........................................ 76/41; 76/51; 76/77

[58] Field of Search ............ 76/37, 41, 51, 53, 75–77, 76/79, 48; 51/216 ND, 34 D; 83/853

[56] References Cited

U.S. PATENT DOCUMENTS

| 545,064 | 8/1895 | Fleck | 76/77 |
|---|---|---|---|
| 2,899,848 | 8/1959 | Spodobalski | 76/51 |
| 2,986,047 | 5/1961 | McConnell | 76/77 |
| 4,018,109 | 4/1977 | Stier | 76/77 |
| 4,034,629 | 7/1977 | Von Armauld et al. | 76/41 |
| 4,111,075 | 9/1978 | Varley | 76/41 |

FOREIGN PATENT DOCUMENTS 1107331  4/1955  France .................................. 76/41

*Primary Examiner*—Roscoe V. Parker
*Attorney, Agent, or Firm*—Douglas A. Lashmit

[57] ABSTRACT

A machine for sharpening circular saw blades includes a pneumatically operated indexing mechanism, with the indexing mechanism being responsive to the position of a grinding mechanism which moves perpendicular to the plane of the saw blade to engage the cutting surface of a tooth.

3 Claims, 5 Drawing Figures

SAW SHARPENING MACHINE

BACKGROUND OF THE INVENTION

The present invention relates to saw sharpening machines, and more particularly to a machine for sharpening and swaging the teeth of large circular saw blades.

Various saw sharpening machines known in the prior art provide for the automatic indexing and sharpening of circular saw blade teeth. Many prior machines, however, have required complex mechanical systems to achieve the desired results. Further, in completely automated machines, a slight difference in the spacing between successive teeth could cause the grinder or sharpening device to remove too much material from the tooth bit being sharpened, often destroying the bit.

SUMMARY OF THE INVENTION

Accordingly, the present invention overcomes many of the above problems by providing a less complex machine including a manually operated grinding mechanism in cooperation with an automatic indexing or blade advancing device, in addition to a pneumatically operated tooth swaging device.

A fully adjustable grinding mechanism is manually pulled through the plane of a circular saw blade rotatably mounted on the machine. After each tooth is sharpened, the blade is advanced by an indexing device responsive to the position of the grinding mechanism. The present machine is adjustable to accommodate saw blades of various sizes.

OBJECTS OF THE INVENTION

It is therefore an object of the present invention to provide an improved machine for sharpening and swaging the teeth of a wide range of sizes of circular saw blades, wherein the machine is easy to adjust, uses relatively inexpensive components, and employs automatic indexing means.

Another object of this invention is to provide a circular saw blade sharpening machine having pneumatically-operated swage means and pneumatically-operated index means for advancing the saw blade one tooth at a time to provide accurate sequential sharpening of the saw teeth.

Still another object of the invention is to provide an improved circular saw blade sharpening machine having an automatic saw blade advancing device responsive to the longitudinal position of a grinding mechanism on a movable carriage.

BRIEF DESCRIPTION OF THE DRAWINGS

Other objects and many of the attendant advantages of this invention will be readily appreciated as the same becomes better understood by reference to the following detailed description when considered in conjunction with the accompanying drawings, in which like reference numerals designate like parts, and wherein.

DESCRIPTION OF THE PREFERRED EMBODIMENT

Figure 1:
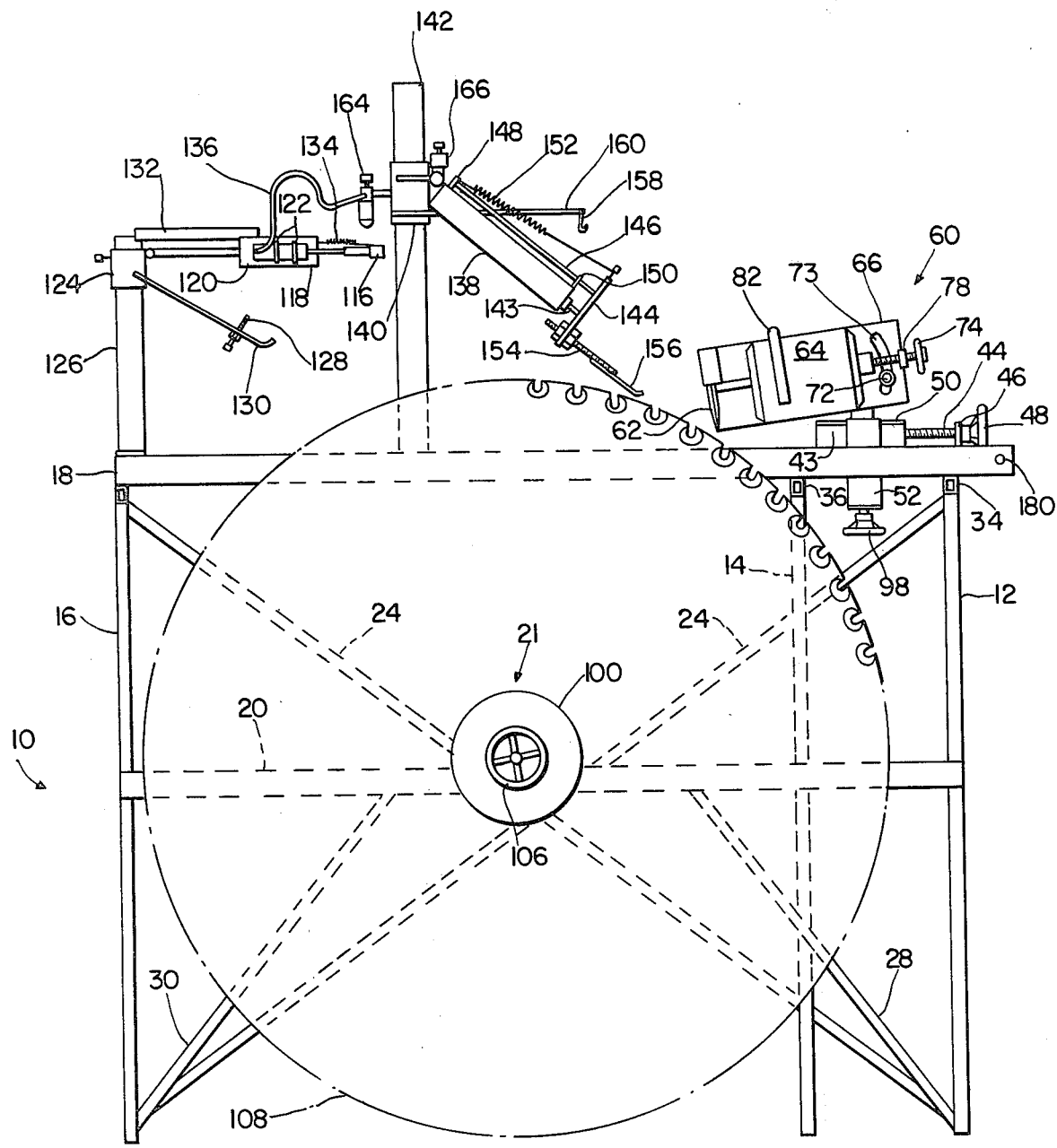
FIG. 1 is a side elevational view of a saw blade sharpening machine according to the present invention.
Figure 2:
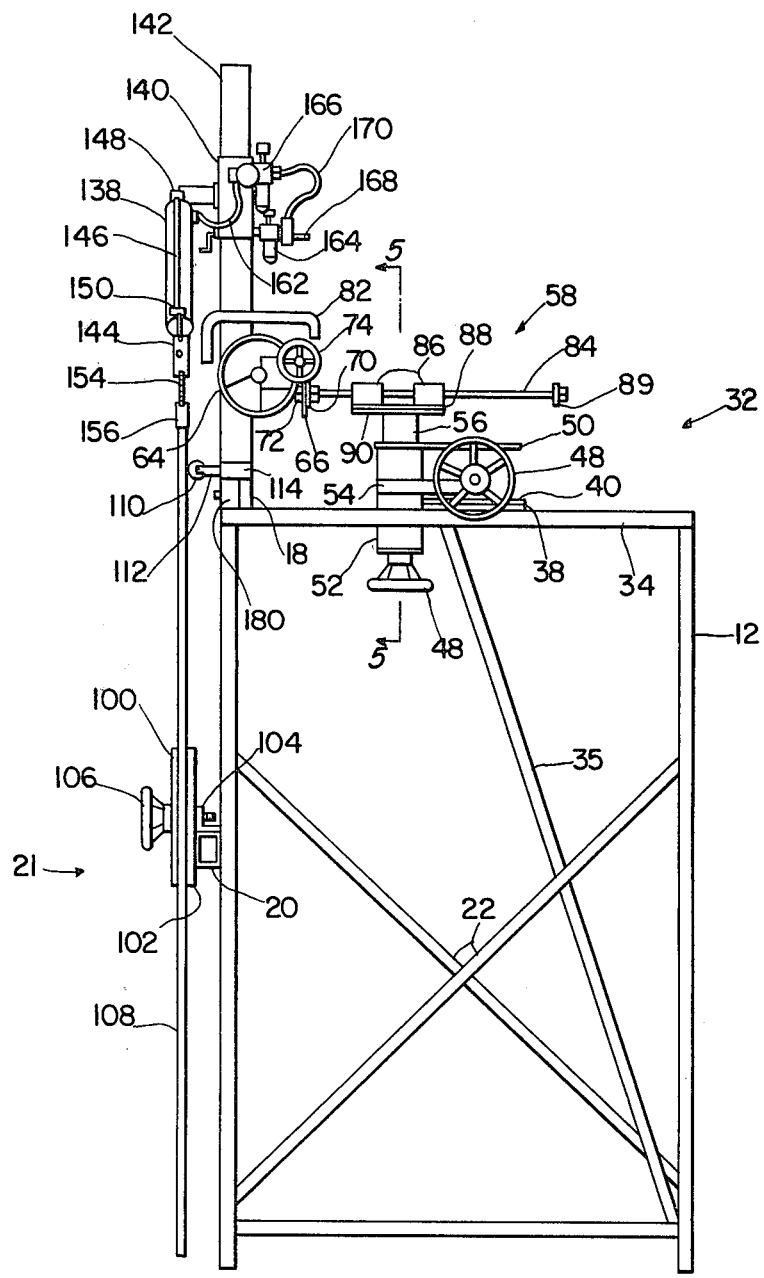
FIG. 2 is a front end elevational view of the machine of FIG. 1.

Referring now to the drawings, there is shown in FIG. 1 a saw blade sharpening machine 10 according to one embodiment of the present invention. The machine 10 is formed of three rectangular support frames 12, 14, and 16 spaced apart and held in a substantially vertical position by a transversely extending horizontal top bar 18 rigidly secured to one corner of support frames 12, 14 and 16. A transversely extending horizontal bar 20 affixed to frames 12, 14 and 16 in an intermediate position serves as a support for an arbor and clamp mechanism 21 to be described in more detail below. Referring to FIG. 2, support frame 12 is rigidly braced by diagonal cross members 22,22 connecting the intermediate positions of its vertical members. Support frame 16 is similarly braced by diagonal cross members and frames 12, 14 and 16 are tied together and additionally braced by diagonal cross members 24,24 affixed to the right side of machine 10 as viewed in the drawings. Further support for horizontal bar 20 is provided by a diagonal cross member 28 extending therefrom to vertical post members of frames 12 and 14, and a diagonal cross member 30 extending from horizontal bar 20 to a vertical post member of frame 16. This structure defines a generally rigid framework which forms the supporting structure for the present machine.

Figure 3:
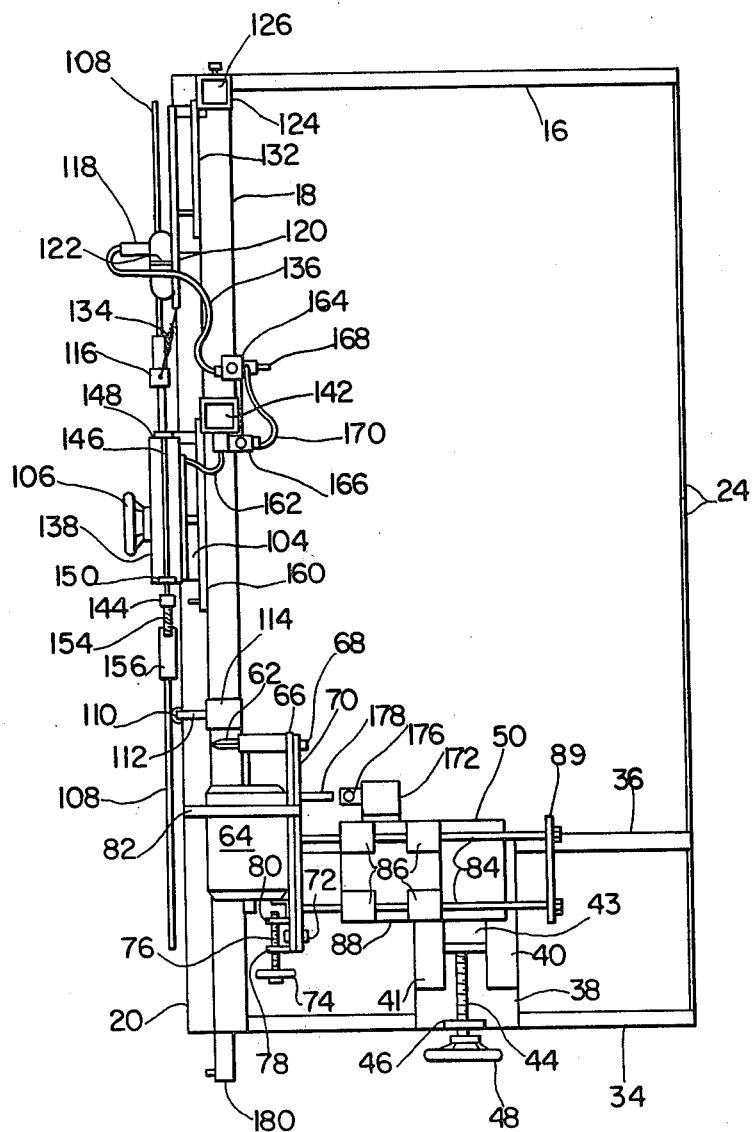
FIG. 3 is a top plan view of the machine of FIGS. 1 and 2.
Figure 4:
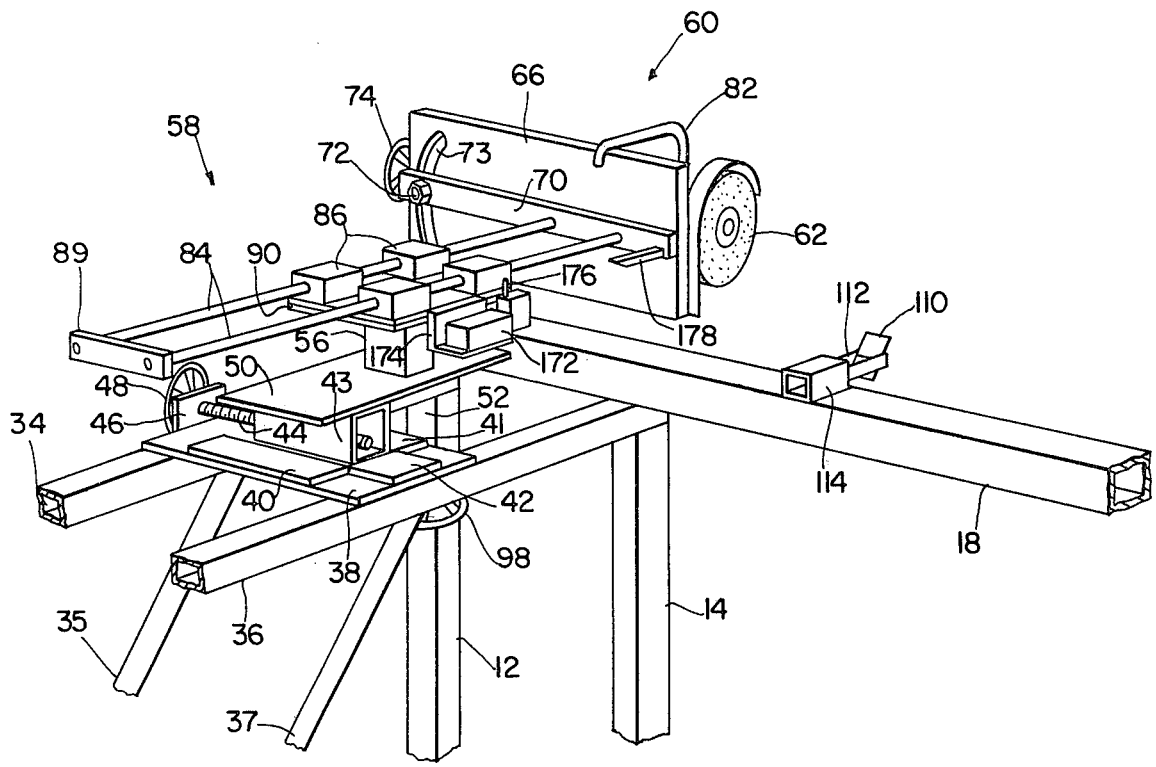
FIG. 4 is a partial perspective view from the right side and rear portions of the machine of FIGS. 1–3, showing the carriage and grinding mechanisms thereof in greater detail.

Referring to FIGS. 2 and 3, an adjustable carriage support, generally designated at 32, is affixed to the main frame and supported by transversely extending horizontal bars 34 and 36 which are rigidly affixed to support frames 12 and 14, respectively. Horizontal bars 34 and 36 are braced by diagonal cross members 35 and 37, respectively, extending from an intermediate portion of the bars to vertical post members in the support frames 12, 14. Referring to FIG. 4, carriage support 32 comprises a rectangular base 38 having affixed thereto guide bars 40 and 41 extending horizontally along an axis perpendicular to the plane of vertical support frame 12. A plate member 42 is slidingly supported on base 38 and confined to longitudinal movement thereon by guide bars 40 and 41. Opposing beveled edges on plate 42 and guide bars 40, 41 constrain plate 42 to longitudinal movement between the bars. Affixed to plate member 42 is a tubular bar 43 having a plate covering the forward end thereof. A threaded screw 44 inserted into a hole in the plate is journaled into and rotatably supported by a vertical bracket 46 affixed to base 38. Adjusting screw 44 is provided at its forward end with a hand wheel 48 which, when rotated, causes tubular bar 43 and plate member 42 to move longitudinally on base 38 between guide bars 40 and 41.

A plate member 50 horizontally affixed to the top of tubular bar 43 has a vertical collar 52 affixed to its underside. Collar 52 is rigidly held in place by a bracket 54 affixed to it and to tubular bar 43, as shown in FIG. 2. A slidable member 56 carried within collar 52 provides support for a movable carriage assembly generally designated by 58. Carriage assembly 58, in turn, supports and provides for the transverse movement of a grinding mechanism 60. Grinding mechanism 60 comprises a grinding wheel 62 rotatably driven by an electric motor 64 which is slidably mounted on a vertical plate member 66 in a manner similar to the mounting of tubular bar 43, with guide bars (not shown) to constrain the motor-grinding wheel mechanism to longitudinal movement. Referring to FIGS. 3 and 4, one end of plate member 66 is pivotally attached at 68 to a horizontal bar 70, the other end of plate 66 being held in place by a bolt 72 passing through an angular slot 73 in plate 66 and threaded into bar 70. The angular adjustment of plate 66 is thus achieved by loosening bolt 72, rotating the plate about pivot 68, and retightening the bolt. The radial movement of the grinding mechaniam 60 is provided by a hand wheel 74 affixed to one end of a threaded bolt 76 journaled into a bracket 78 attached to plate member 66. The shaft of bolt 76 is threaded into a bracket 80 affixed to the plate that supports motor 64. Rotation of hand wheel 74 thus moves motor 64 and grinding wheel 62 radially with respect to pivot 68. A handle 82 affixed to plate member 66 provides for the manual transverse movement of grinding mechanism 60 during the saw sharpening operation.

Figure 5:
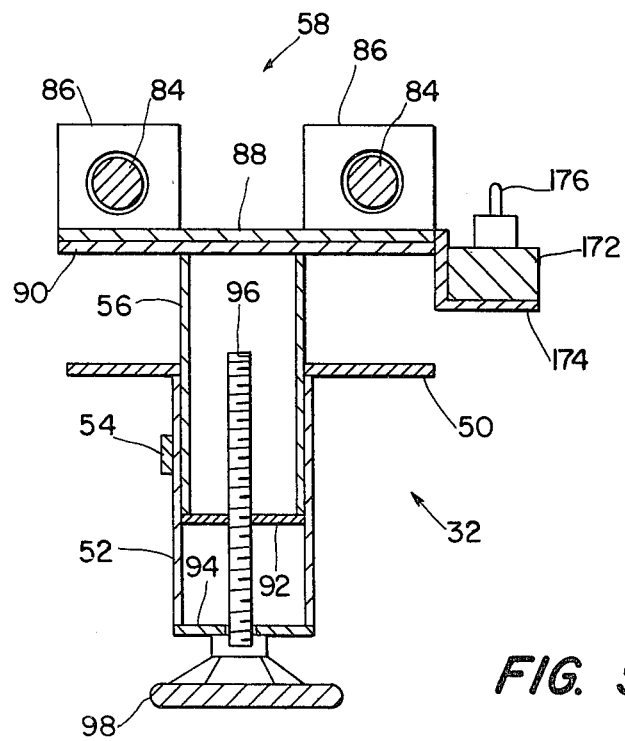
FIG. 5 is a fragmentary vertical cross-sectional view taken substantially along the line 5—5 in FIG. 2.

Referring to FIGS. 4 and 5, carriage assembly 58 is formed of a pair of transversely extending rods 84 each of which is slidably received in and supported by a pair of ball bushing blocks 86, the blocks 86 being affixed to a plate member 88. One end of each rod 84 is threaded into bar 70, the other end of each rod being affixed to a spacer 89. Plate member 88 is affixed to a plate member 90 that is mounted on the vertical slidable member 56. As most clearly shown in FIG. 5, a bracket 92 is affixed to the lower end of member 56 carried within collar 52, and a bracket 94 is affixed to the lower end of collar 52. A threaded bolt 96 journaled into bracket 94 and threaded through bracket 92 has a hand wheel 98 mounted on its lower end. Rotation of hand wheel 98 causes member 56 to slide vertically within collar 52, thereby providing elevational adjustment for carriage assembly 58 and grinding mechanism 60. Rotation of hand wheels 48, 98 and 74 and the pivotting of plate 66 thus provides longitudinal, elevational, radial and angular adjustments for the positioning of grinding wheel 62.

Referring again to FIGS. 1 and 2, arbor and clamp mechanism 21, mounted on an intermediate portion of horizontal bar 20, is formed of two centrally apertured disc shaped members 100 and 102 having a partially threaded shaft therethrough, the shaft being journaled into and supported by an angle bracket 104 affixed to frame bar 20. Threaded onto one end of the shaft is a hand wheel 106 which, when rotated, clampingly secures a circular saw blade 108 between disc members 100 and 102. Thus, saw blade 108 may be easily mounted on the shaft and secured thereon by the insertion of disc member 100 and the tightening of hand wheel 106, the removal of blade 108 being achieved by a reverse procedure.

The flexure of blade 108 during the sharpening process is limited by a roller 110 journaled onto a bar member 112. Bar member 112 is slidably mounted in a collar 114 affixed to top frame bar 18. The assembly is adjusted so that roller 110 presses against blade 108 to support the blade against inward flexure.

After saw blade 108 is mounted on arbor and clamp mechanism 21, a swaging operation is performed in order to properly spread and shape the teeth in preparation for sharpening. Means for swaging, referring to FIGS. 1 and 3, is provided by a swage die 116 affixed to a pneumatic impact driver 118, which is in turn affixed to a vertical plate member 120 by U-bolts 122. Plate member 120 is pivotally connected to a collar 124 which is slidingly mounted on a vertical post member 126 affixed to the rear portion of top frame bar 18. During the swaging operation plate member 120 is adjustably supported in a downwardly angled position by a bolt 128 threaded into a lower support bar 130, which is rigidly affixed to collar 124 at a predetermined angle below the horizontal. When the swaging operation is completed plate member 120 is stored in a horizontal position as shown in FIG. 1 by means of a hook on an upper support bar 132 affixed to collar 124. A spring 134 coupled between swage die 116 and plate 120 provides return force for the die 116 after it impacts against a saw tooth. Impact driver 118 is coupled by a hose 136 to a source of air pressure as will be described below.

In operation, once saw blade 108 is mounted on machine 10, plate member 120 is lowered onto bolt 128. Collar 124 and bolt 128 are adjusted so that swage die 116 engages a tooth on the saw blade, whereupon impact driver 118 is activated causing die 116 to repeatedly strike against the tooth until it is properly shaped and spaced. Blade 108 is then rotated by hand so that the next tooth may be swaged, the process being repeated until all of the teeth have been properly shaped and spread in preparation for sharpening.

An automatic indexing mechanism is provided to advance saw blade 108 one tooth at a time until each tooth has been sharpened. The present indexing mechanism is formed of a pneumatically operated jack 138 pivotally mounted on a collar 140. Collar 140 is slidably mounted on a vertical post member 142 affixed to the support frame top bar 18. Jack 138 includes an extensible piston rod 143 having affixed to its outer end a bar 144 mounted perpendicular to the longitudinal axis of the jack. Bar 144 is braced in this position by a guide rod 146 affixed to the bar and slidably supported by two brackets 148, 150 affixed to the top of jack 138. A spring 152 between bracket 148 and the upper end of bar 144 provides return foce to retract piston rod 143 when the pneumatic pressure in jack 138 is released. An adjustable bolt member 154 mounted on the lower portion of bar 144 and coplanar with the axis of jack 138 has affixed thereto a pawl 156 for engaging the teeth of saw blade 108. During the indexing operation jack 138 is in the downwardly angled position shown in FIG. 1. When a saw blade 108 is being mounted on or removed from machine 10, or when the saw teeth are being swaged, jack 138 may conveniently be supported in a horizontal position by a hook 158 mounted on a horizontal bar 160 affixed to collar 140.

Referring to FIGS. 2 and 3, pneumatic pressure to operate impact driver 118 and jack 138 is supplied through hoses 136 and 162 coupled to regulators 164 and 166, respectively. A source of air pressure (not shown) is coupled to a hose bib 168 which supplies regulator 164 directly and regulator 166 through a hose 170.

Regulator 166 includes therein an electrically operated valve which, when energized, opens and couples the air supply to jack 138. Pressurization of jack 138 causes piston rod 143 to extend which in turn engages pawl 156 with a tooth on saw blade 108. The full extension of piston rod 143 rotates blade 108 clockwise through an angle corresponding to the angular spacing between successive teeth. When the valve is deenergized the air supply is cut off and the air in jack 138 is exhausted through the valve. Spring 152, tensioned during the extension of piston rod 143, exerts a return force on bar 144 and retracts rod 143 into jack 138.

Pawl 156 then drops into the next successive tooth in a counterclockwise direction.

The valve in regulator 166 is controlled by a microswitch 172 mounted on a bracket 174 affixed to one side of carriage assembly 58, as shown in FIG. 5. Microswitch 172 includes a plunger 176 which, when depressed, opens the switch. Referring to FIG. 4, a beveled stud 178 mounted on and extending outwardly from horizontal bar 70 engages and depresses plunger 176 when grinding mechanism 60 is pushed toward carriage support 32. Conversely, when grinding mechanism 60 is pulled away from support 32 the stud 178 disengages from plunger 176 which rises and closes microswitch 172. A power switch 180 is mounted on forward end of support frame top bar 18 and is coupled to a source of electrical power (not shown). Switch 180 controls motor 64 and is connected in coupling sequence to microswitch 172 and the valve in regulator 166. Thus, when grinding mechanism 60 is pushed toward carriage support 32, stud 178 engages plunger 176 and opens microswitch 172. This deenergizes the valve in regulator 166 and depressurizes jack 138, causing pawl 156 to retract. When grinding mechanism 60 is pulled away from support 32, microswitch 172 closes which energizes the valve and pressurizes jack 138. Pawl 156 then extends and advances saw blade 108 by one tooth.

In the operation of the present machine, a saw blade 108 to be sharpened is mounted on arbor and clamp mechanism 21 and swaged as described above. Next, the stroke and height of jack 138 is adjusted to accommodate the saw blade. The longitudinal, elevational and angular position of grinding wheel 62 is then set by operation of hand wheels 48, 98, 74 and bolt 72 so that when the grinding wheel is pulled through the plane of blade 108 a tooth is sharpened at the desired angle. Grinding mechanism 60 is then pushed back toward carriage support 32 causing saw blade 108 to advance by one tooth as described above. This procedure is repeated until all of the teeth on blade 108 have been successively sharpened. The provisions for adjustment of the grinding, indexing and swage mechanisms permit the present machine to accommodate saw blades of various sizes.

Thus, there has been provided by the present invention an improved circular saw blade sharpening machine including an automatic indexing mechanism that permits a saw blade to be accurately swaged and sharpened in a minimum amount of time.

Obviously, many modifications and variations of the present invention are possible in the light of the above teachings. It is therefore to be understood that within the scope of the appended claims the invention may be practiced otherwise than as specifically described herein.

What is claimed is:

1. A circular saw blade sharpening machine comprising:

an upstanding supporting frame;
a blade-supporting shaft journaled on said frame;
means to clampingly secure a circular saw blade to an end portion of said shaft in a substantially vertical position at one side of said frame;
a carriage connected to said frame by a pair of slide rods each of which are slidably supported by a plurality of bearing blocks, wherein said carriage is constrained to move along an axis substantially perpendicular to and passing through the plane of said saw blade;
a grinding wheel rotatably mounted on said carriage in a position to engage the cutting surface of a tooth of said saw blade as said carriage is moved along its axis;
means affixed to said carriage for driving said grinding wheel;
pneumatically operated index means connected to said frame and positioned in the plane of said saw blade for engaging the teeth of said saw blade and rotating said saw blade through an angle corresponding to the angular spacing between successive teeth; and
means affixed to said frame and engaged by said slide rods for activating said index means when said carriage is at a predetermined position.
which moves perpendicular to the plane of the saw blade to engage the cutting surface of a tooth.

2. The circular saw blade sharpening machine of claim 1, further including:

alignment means for providing longitudinal, elevational and angular adjustment of said carriage and thereby provide the proper engagement of said grinding wheel with said circular saw blade teeth.

3. The circular saw blade sharpening machine of claim 2 wherein said index means comprises:

pneumatically operated jack means adjustably connected to said frame and including an extensible piston rod therein;
a pawl support member affixed to one end of said piston rod;
a pawl bar adjustably attached to said pawl support member for successively engaging the teeth of said saw blade;
spring bias means for retracting said piston rod into said jack means in the absence of pneumatic pressure therein;
a source of pneumatic pressure; and
valve means coupled to said source of pneumatic pressure and to said jack means for alternately pressurizing and depressurizing said jack means responsive to said activating means and thereby alternately extending and retracting said piston rod, the extension of said piston rod being sufficient to engage said pawl bar with a tooth on said saw blade and rotate said saw blade through an angle corresponding to the angular spacing between successive teeth.

* * * * *